(12) United States Patent
Zehnder, II et al.

(10) Patent No.: US 6,374,721 B1
(45) Date of Patent: Apr. 23, 2002

(54) VACUUM BOOSTER WITH RETAINING MECHANISM FOR CYLINDER CAP

(75) Inventors: James William Zehnder, II, Huber Heights; Gary Chris Fulks, Dayton; Larry R Miller, Springfield, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 52 days.

(21) Appl. No.: 09/634,241

(22) Filed: Aug. 8, 2000

(51) Int. Cl.$^7$ ................................................ F15B 9/09
(52) U.S. Cl. ......................................................... 91/367
(58) Field of Search ................................ 91/367, 376 R

(56) References Cited

U.S. PATENT DOCUMENTS

| | | | | |
|---|---|---|---|---|
| 4,598,625 A | * | 7/1986 | Belart | 91/376 R |
| 6,164,183 A | * | 12/2000 | Fulks et al. | 91/367 |
| 6,170,382 B1 | * | 1/2001 | Tsubouchi et al. | 91/367 |

\* cited by examiner

*Primary Examiner*—Kevin Lee
(74) *Attorney, Agent, or Firm*—Robert M Sigler

(57) ABSTRACT

A brake vacuum booster assembly is provided that includes a power piston with a two-piece member movable relative thereto for opening a valve when a brake pedal is applied. The two-piece member includes a cylinder and a cylinder cap. The cylinder has a passageway vented to atmosphere for providing air to air chamber in the booster. An electric actuator is retained within a cavity in the cylinder for coacting with the valve to more quickly open the valve during a rapid brake pedal apply. A cylinder cap is connected to an end of the cylinder for retaining the electric actuator within the cavity. The cylinder cap has an opening aligned with the passageway. A retaining mechanism is arranged between the cylinder and the cylinder cap for preventing axial and rotational movement of the cylinder cap relative to the cylinder to securely retain the electric actuator within the cavity and maintain alignment of the opening and passageway.

22 Claims, 4 Drawing Sheets

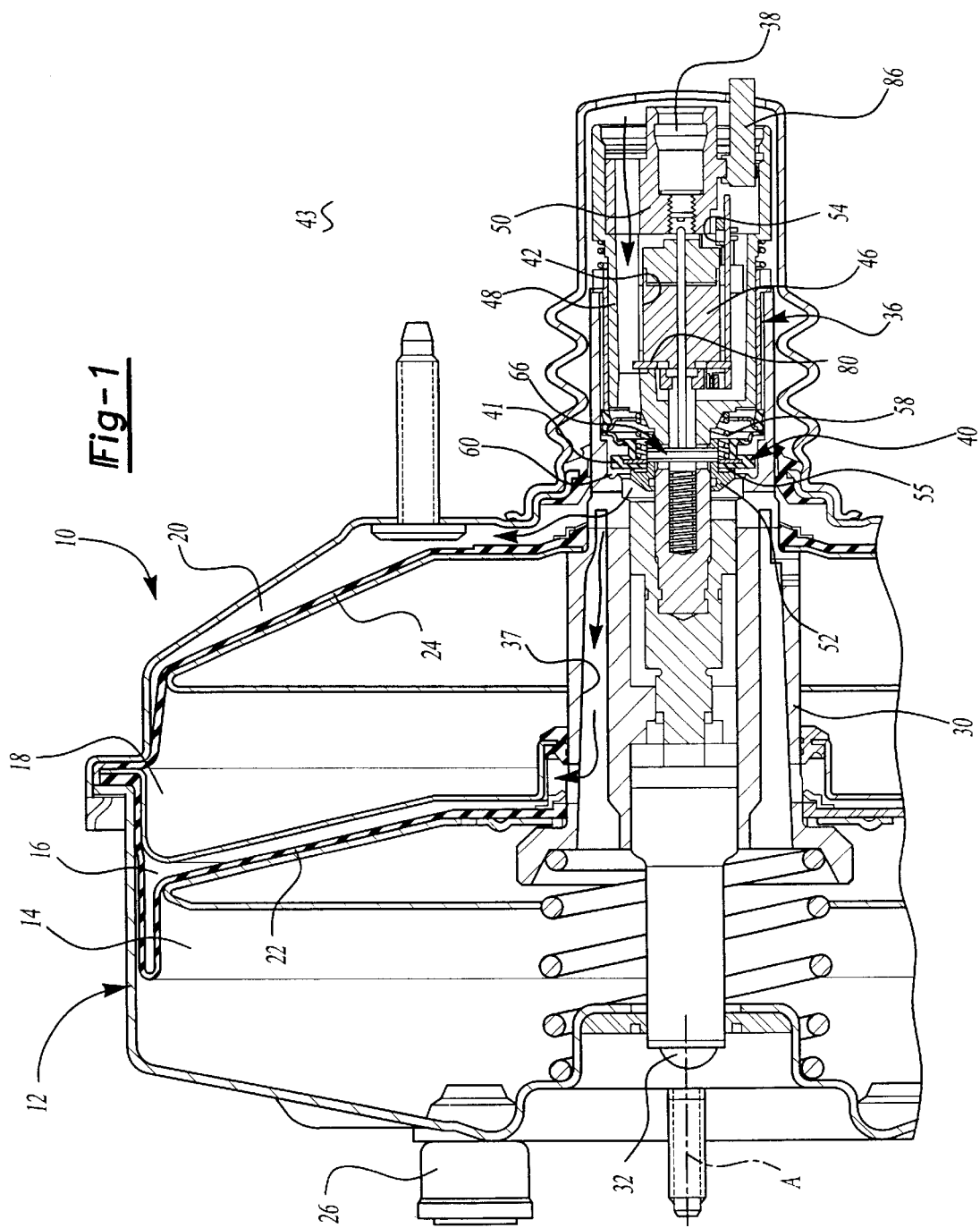

Fig-2C
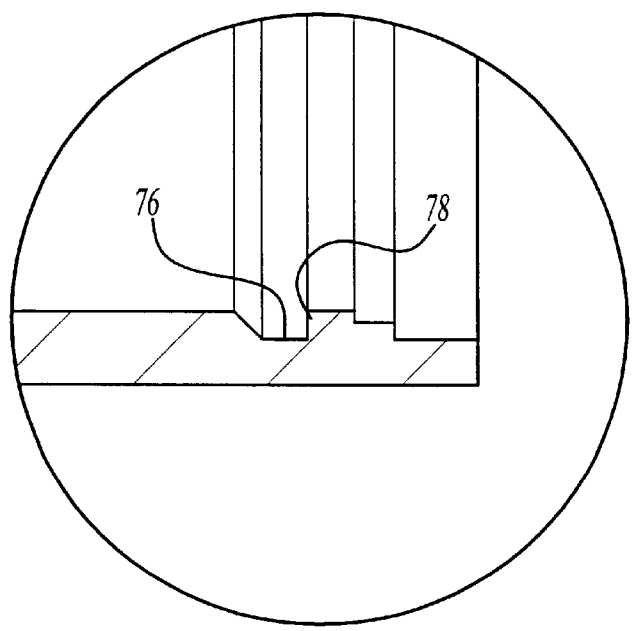
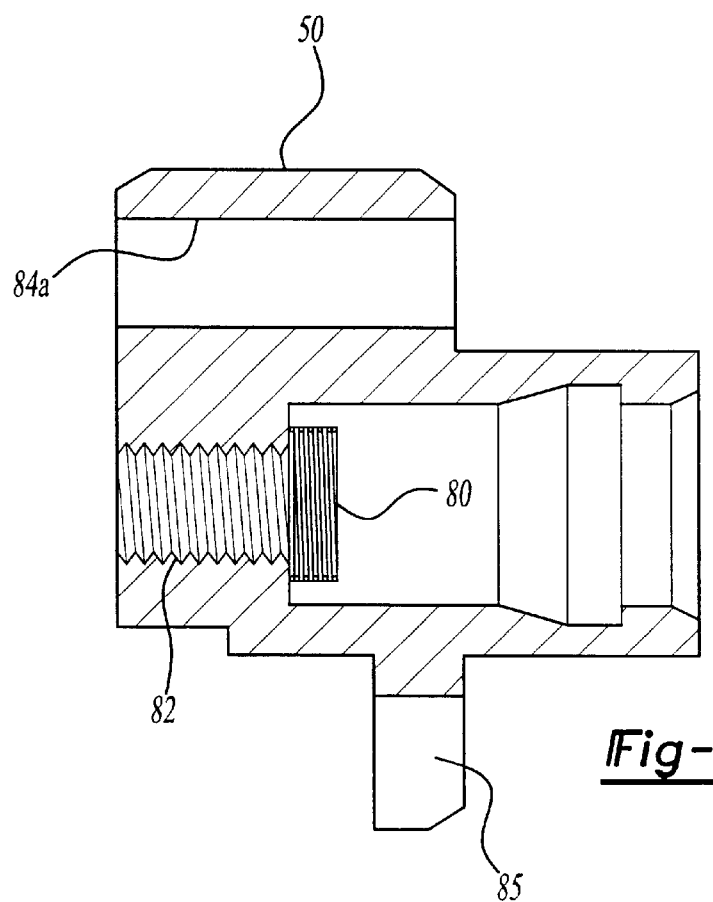
Fig-3A

VACUUM BOOSTER WITH RETAINING MECHANISM FOR CYLINDER CAP

TECHNICAL FIELD

This invention relates to a brake vacuum booster, and more specifically, the invention relates to a vacuum booster that uses an electric actuator to improve the response time of the booster.

BACKGROUND OF THE INVENTION

Brake vacuum boosters have been used extensively to increase the force applied to the master cylinder actuator when the brake pedal is applied. Vacuum boosters include a booster housing having several pressure chambers and at least one diaphragm. The diaphragm is connected to a power piston against which a primary force from the brake pedal is applied. The diaphragm also exerts a force against the power piston to supplement the force from the brake pedal. A valve is arranged between the power piston and a movable member that is connected to the brake pedal by a mechanical linkage. The member moves relative to the power piston to open and close the valve in response to brake pedal actuation. Air passages run along the movable member to provide air at atmospheric pressure to pressure chambers through the open valve, which changes the pressure differential across the diaphragm and causes the diaphragm to apply additional force to the power piston.

In an effort to increase response time of the vacuum booster when the brake pedal is applied rapidly, electric actuators have been incorporated to more rapidly open the valve and increase the force the diaphragm is able to apply on the power piston during rapid brake pedal applications. The electric actuator has been encapsulated in the movable member, which has required constructing the movable member from two components: a cylinder and a cylinder cap. Since the cylinder and cylinder cap must accommodate the air passages, it is important that they remain in alignment with one another during operation of the booster. Furthermore, the cylinder and cylinder cap are preferably used to securely retain the electric actuator within the cylinder. Previously, C- clips received in arcuate grooves in the cylinder were used, however, this arrangement permitted relative axial and rotational movement. Therefore, what is needed is a suitable cylinder and cylinder cap configuration and retaining mechanism to maintain alignment of various components and features while securely retaining the electric actuator.

SUMMARY OF THE INVENTION

The present invention provides a brake vacuum booster assembly that includes a booster housing with a plurality of chambers and a diaphragm separating the chambers. A power piston has a first passageway in fluid communication with one of the chambers, and the diaphragm is interconnected to the power piston for moving the power piston along an axis. A cylinder is at least partially disposed within a portion of the power piston and is movable along the axis relative to the power piston. The cylinder has a second passageway vented to atmosphere and in fluid communication with the first passageway. A valve is movable to an open position when the cylinder is moved along the axis relative to the power piston toward the booster housing. The valve is arranged between the first and second passageways for connecting the passageways and venting the second passageway and the one of the chambers to atmosphere when in the open position.

An electric actuator is retained within a cavity in the cylinder for coacting with the valve and moving the valve to the open position in response to an electronic request signal. A cylinder cap is connected to an end of the cylinder for retaining the electric actuator within the cavity. The cylinder cap has an opening aligned with the second passageway. A retaining mechanism is arranged between the cylinder and the cylinder cap for preventing axial and rotational movement of the cylinder cap relative to the cylinder to securely retain the electric actuator within the cavity and maintain alignment of the opening and second passageway.

Accordingly, the above invention provides a suitable cylinder and cylinder cap configuration and retaining mechanism to maintain alignment of various components and features while securely retaining the electric actuator.

BRIEF DESCRIPTION OF THE DRAWINGS

Other advantages of the present invention can be understood by reference to the following detailed description when considered in connection with the accompanying drawings wherein:

FIG. 1 is a cross-sectional view of the present invention brake booster assembly;

FIGS. 2A and 2C are enlarged cross-sectional views of a cylinder shown in FIG. 1;

FIG. 3A is an enlarged cross-sectional view of a cylinder cap shown in FIG. 1;

DESCRIPTION OF THE PREFERRED EMBODIMENT

Figure 2A:
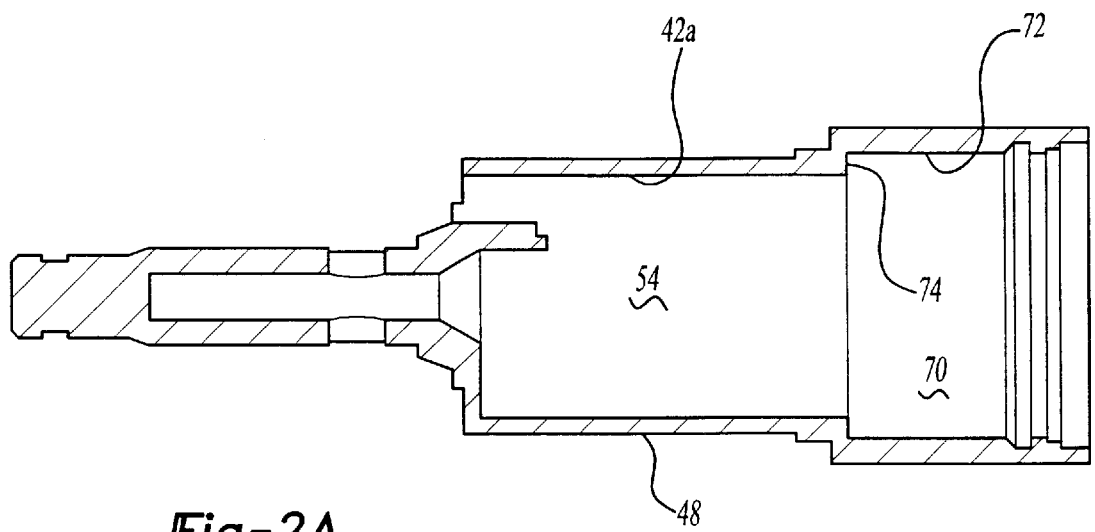

Referring to FIG. 1, a brake vacuum booster assembly 10 includes a booster housing 12 with a plurality of chambers 14, 16, 18, 20. Booster assembly 10 has a tandem diaphragm configuration in which a diaphragm 22 separates chambers 14, 16, and a diaphragm 24 separates chambers 18, 20. Air is evacuated from the chambers 14, 16, 18, 20 through a check valve 26 by the vehicle's engine to create a vacuum. The diaphragms 22, 24 are secured to a power piston 30 that is connected to the master cylinder's hydraulic actuator by a rod 32 supported on an end of the power piston 30. The power piston 30 is movable along an axis, A.

The power piston 30 supports a member 36 that is movable relative to the power piston 30. The power piston 30 has a first passageway 37 in fluid communication with the chambers 16, 20. The member 36 supports an actuator rod 38, which is connected to the brake pedal by a mechanical linkage. A valve 40, which preferably includes a flexible rubber seal 41, is arranged between the power piston 30 and the member 36. Member 36 has a second passageway 42 that is vented to atmosphere 43. Valve 40 connects the first 37 and second 42 passageways when in an open position. When the valve 40 is moved to an open position, atmospheric air (indicated by arrows) is permitted to flow through the second passageway 42 past the valve 40 and through first passageway 37 into chambers 16, 20. Since chambers 14, 18 are at a lower engine vacuum pressure, the diaphragms 22, 24 are forced in a leftward direction in FIG. 1. In this manner, the diaphragms 22, 24 move the power piston 30 to supplement the force applied by actuator rod 38 from the brake pedal.

As mentioned above, it is desirable to ensure that the valve 40 opens quickly on rapid brake pedal applies so that the force from the actuator rod 38 is adequately supplemented by the force from the diaphragms 22, 24. To this end, an electric actuator, preferably an electric motor 46, has been incorporated into the booster assembly 10 to open the valve 40 more quickly. The electric motor 46 is preferably encapsulated in the member 36, which includes a cylinder 48 and a cylinder cap 50 that is secured to the cylinder 48. The electric motor 46 is dispose within a cavity 54 in the cylinder 48. The seal 41 seals against a lip 55 on the sleeve 52 when in a closed position. The valve 40 includes a sleeve 52 that is supported on the cylinder 48. A spring 58 biases the sleeve 52 to the closed position.

During a brake pedal apply, the actuator rod 38 moves the cylinder 48 and sleeve 52 which moves seal 41 into engagement with an annular protrusion 60 on the power piston 30. The annular protrusion 60 forces seal 41 out of engagement with lip 55 thereby connecting first 37 and second 42 passageways and opening valve 40. The electric motor 46 drives a shaft assembly 66 which coacts with sleeve 52 to slide the sleeve 52 relative to the cylinder 48 and move the seal 41 into engagement with the annular protrusion 60. In this manner, the valve 40 may be opened more quickly by the electric motor 46 in response to an electronic request signal. Typically the request signal is sent to the electric motor 46 when a high rate of brake pedal movement is detected indicating an emergency stop and a need for maximum braking force to the master cylinder.

Figure 2B:
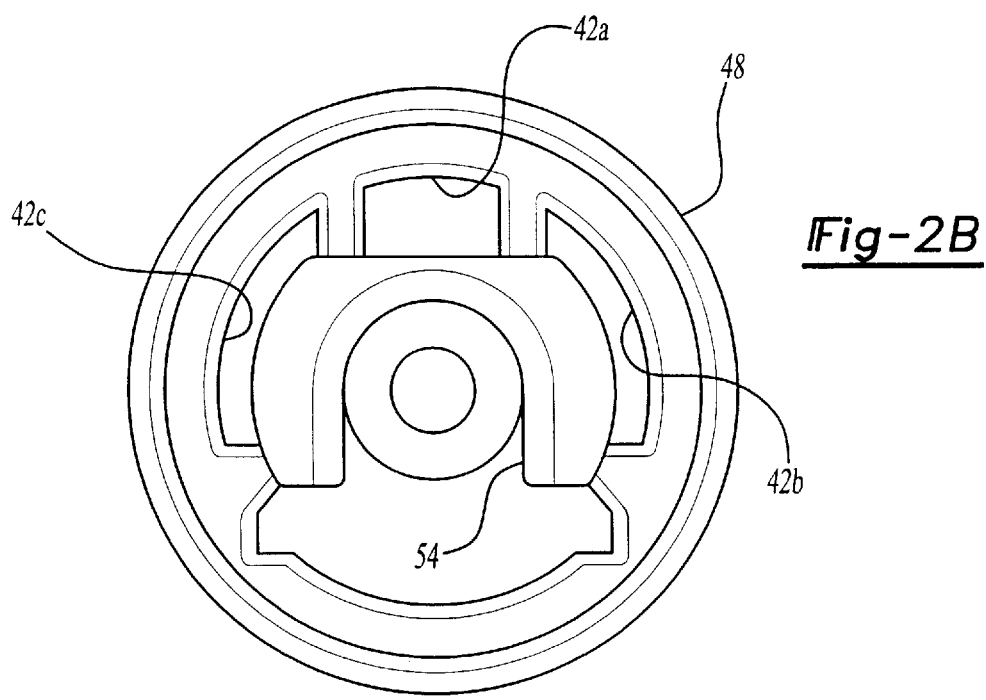
FIG. 2B is a front elevational view of the cylinder shown in FIG. 2A.

The cylinder 48 is at least partially disposed within a portion of the power piston 30 and is movable along the axis, A, relative to the power piston 30. Referring additionally to FIGS. 2A and 2B, preferably the second passageway 42 includes a plurality of passages 42a, 42b, 42c, to increase airflow to the chambers 16, 20 when the valve 40 is open. The cylinder 48 includes a cylindrical cavity 70 having an interior surface 72 and a shoulder 74 between the cylindrical cavity 70 and cavity 54. The interior surface 72 includes an annular groove 76 having a tapered surface 78 extending inwardly toward the cavity 54.

Figure 3B:
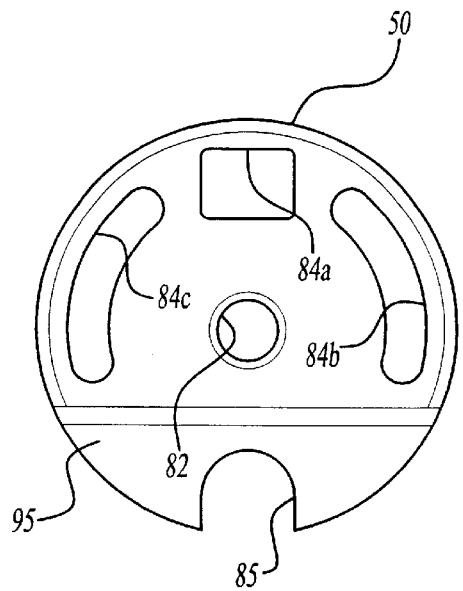
FIG. 3B is a front elevational view of the cylinder cap shown in FIG. 3A.

The cylinder cap 50 is received within the cylindrical cavity 70 adjacent to the interior surface 72 and in abutment with the shoulder 74, as shown in FIG. 1. Referring additionally to FIGS. 3A and 3B, the cylinder cap 50 is connected to the end of the cylinder 48 to securely retain the electric motor 46 within the cavity 54. The front of the electric motor 46 abuts an inner ledge 80. A threaded fitting 82 is received in a threaded hole 84 in the cylinder cap 50 and supports the rear of the electric motor 46. The cylinder cap 50 supports the actuator rod 38, which applies the brake pedal force to the cylinder 48. Accordingly, it is important that the cylinder cap 50 not shift axially relative to the cylinder 48.

The cylinder cap 50 has openings 84a, 84b, 84c aligned with the second passages 42a, 42b, 42c, for permitting atmospheric air to flow to the second passageway 42. The cylinder cap 48 also includes an aperture 85 that receives a cable 86 having wires that are electrically connected to the electric motor 46 and sensors. Accordingly, it is important that the cylinder cap 50 not rotate relative to the cylinder 48 so that the passageway 42 is not restricted and strain is not placed on the cable 86.

Figure 4:
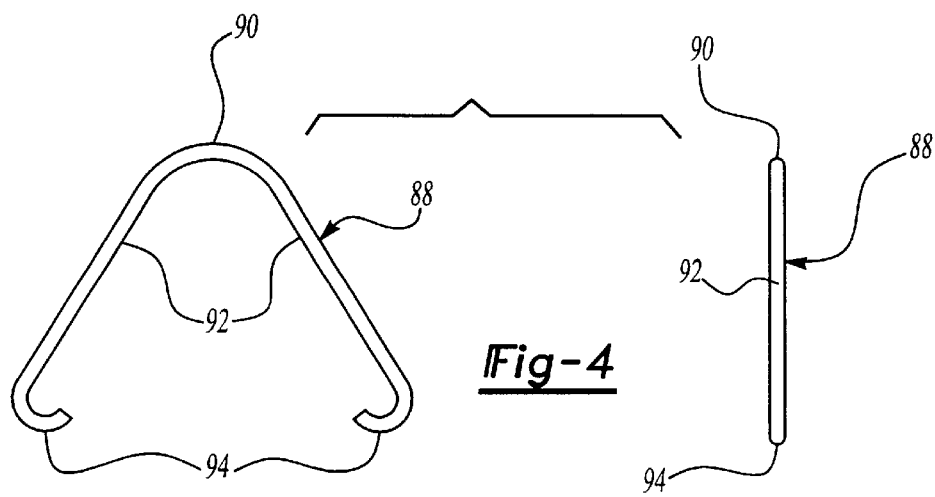
FIG. 4 is an elevational view of a retaining clip shown in FIG. 1.
Figure 5:
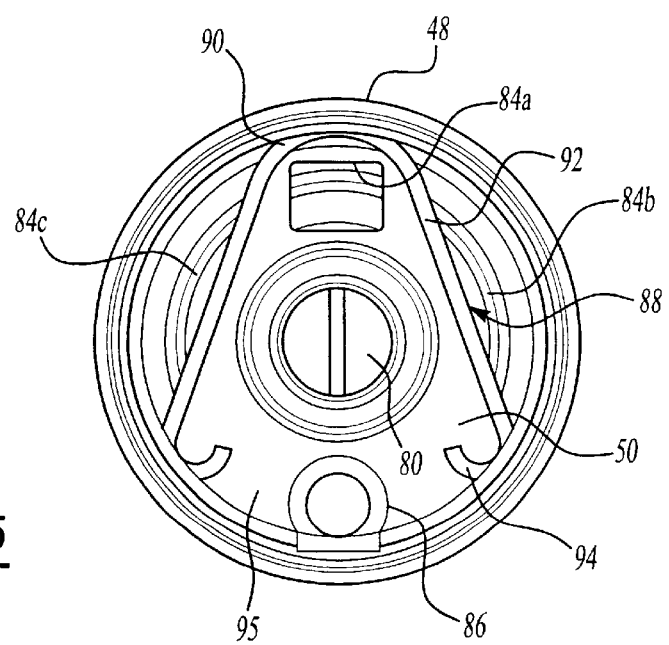
FIG. 5 is a front elevational view of the cylinder, cylinder cap, and retaining clip fully assembled.

To prevent axial and rotational movement of the cylinder cap 50 relative to the cylinder 48, a retaining mechanism is arranged between the cylinder 48 and the cylinder cap 50. The retaining mechanism securely retains the electric motor 46 within the cavity 54 and maintains alignment between the openings 84 and second passageway 42. In one embodiment of the present invention, a retaining clip 88, shown in FIG. 4, is received in the groove 76 in abutting relationship with the cylinder cap 50. The tapered surface 78 forces the retaining clip 88 against the cylinder cap 50 to prevent axially movement of the cylinder cap 50 relative to the cylinder 48. The retaining clip 88 is generally V-shaped with an apex 90 with depending legs 92 having terminal ends 94. The apex 90 and terminal ends 94 are received in the groove 76, and the legs 92 engage an outer face 95 of the cylinder cap 50, as best shown in FIG. 5.

In a second embodiment, the retaining mechanism may include a coating on either the interior surface 72 or the cylinder cap 50 to tighten the fit between the cylinder 48 and the cylinder cap 50. Preferably, the second embodiment is used in addition to the first embodiment. Preferably, the coating is on the cylinder cap, which is constructed from a material containing primarily aluminum. The cylinder cap may be anodized, preferably according to ASTM B580, Type A Hard Coat. The anodized coating increases the coefficient of friction between the interior surface 72 and the cylinder cap 50 and reduces the clearance there between to prevent relative axial and rotary motion.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A brake vacuum booster assembly comprising:

a booster housing with a plurality of chambers and a diaphragm separating said chambers;

a power piston having a first passageway in fluid communication with one of said chambers with said diaphragm interconnected to said power piston for moving said power piston along an axis;

a cylinder at least partially disposed within a portion of said power piston for movement along said axis relative to said power piston, said cylinder having a second passageway vented to atmosphere and in fluid communication with said first passageway;

a valve movable to an open position when said cylinder is moved along said axis and relative to said power piston toward said booster housing, said valve arranged between said first and said second passageways for connecting said passageways and venting said second passageway and said one of said chambers to atmosphere when in said open position;

an electric actuator retained within a cavity in said cylinder for coacting with said valve and moving said valve to said open position in response to an electronic request signal;

a cylinder cap connected to an end of said cylinder for retaining said electric actuator within said cavity, said cylinder cap having an opening aligned with said second passageway; and a retaining mechanism interposed between the cylinder and the cylinder cap for preventing axial and rotational movement of said cylinder cap relative to said cylinder to securely retain said electric actuator within said cavity and maintain alignment of said opening and second passageway.

2. The assembly as set forth in claim 1, wherein said cylinder includes an interior surface with a shoulder adjacent to said cavity, and said retaining mechanism includes an annular groove in said interior surface having a tapered surface extending inwardly toward said cavity and a retaining clip received in said groove in abutting relationship with said cylinder cap, said tapered surface forcing said retaining clip against said cylinder cap.

3. The assembly as set forth in claim 2, wherein said retaining clip is generally V-shaped with an apex and depending legs with terminal ends, said apex and terminal ends received in said groove, said legs engaging an outer face of said cylinder cap.

4. The assembly as set forth in claim 1, wherein said cylinder includes a cylindrical cavity having an interior surface adjacent to said cavity with said cylinder cap received within said cylindrical cavity adjacent to said interior surface, and wherein said retaining mechanism includes a coating on one of said interior surface and cylinder cap to tighten a fit between said cylinder and said cylinder cap.

5. The assembly as set forth in claim 4, wherein said coating is on said cylinder cap.

6. The assembly as set forth in claim 5, wherein said cylinder cap is aluminum and said coating comprises said cylinder cap being anodized.

7. The assembly as set forth in claim 4, wherein said coating increases the coefficient of friction of said one of said interior surface and said cylinder cap.

8. The assembly as set forth in claim 1, wherein said second passageway includes a plurality of passages and said cylinder cap includes a plurality of said openings aligned with said plurality of passages.

9. The assembly as set forth in claim 1, further including a sleeve supported on said cylinder with said electric actuator moving said sleeve to move said valve to said open position.

10. The assembly as set forth in claim 1, wherein said assembly further includes an actuator rod connected to said cylinder and actuatable by a brake pedal for moving said valve to said open position, said actuator rod being supported by said cylinder end.

11. The assembly as set forth in claim 1, wherein said cylinder cap includes an aperture that receives a cable having wires electrically connected to said electric actuator.

12. The assembly as set forth in claim 1, wherein said cylinder cap includes a threaded hole with a threaded fitting secured therein, said threaded fitting supporting an end of said electric actuator with an opposite end of said electric actuator abutting an inner ledge within said cavity.

13. A brake vacuum booster assembly comprising:
a cylinder movable along an axis and having a passageway vented to atmosphere;
a valve having a sleeve movable to an open position and a seal interconnecting said cylinder and said sleeve sealing said passageway in a closed position;
an electric actuator retained within a cavity in said cylinder for moving said sleeve to said open position in response to an electronic request signal;
a cylinder cap connected to an end of said cylinder for retaining said electric actuator within said cavity, said cylinder cap having an opening aligned with said passageway; and
a retaining mechanism interposed between the cylinder and the cylinder cap for preventing axial and rotational movement of said cylinder cap relative to said cylinder to securely retain said electric actuator within said cavity and maintain alignment of said opening and second passageway.

14. The assembly as set forth in claim 13, wherein said cylinder includes an interior surface with a shoulder adjacent to said cavity, and said retaining mechanism includes an annular groove in said interior surface having a tapered surface extending inwardly toward said cavity and a retaining clip received in said groove in abutting relationship with said cylinder cap, said tapered surface forcing said retaining clip against said cylinder cap.

15. The assembly as set forth in claim 14, wherein said retaining clip is generally V-shaped with an apex and depending legs with terminal ends, said apex and terminal ends received in said groove, said legs engaging an outer face of said cylinder cap.

16. The assembly as set forth in claim 13, wherein said cylinder includes a cylindrical cavity having an interior surface adjacent to said cavity with said cylinder cap received within said cylindrical cavity adjacent to said interior surface, and wherein said retaining mechanism includes a coating on one of said interior surface and cylinder cap to tighten a fit between said cylinder and said cylinder cap.

17. The assembly as set forth in claim 16, wherein said coating is on said cylinder cap.

18. The assembly as set forth in claim 17, wherein said cylinder cap is aluminum and said coating comprises said cylinder cap being anodized.

19. The assembly as set forth in claim 16, wherein said coating increases the coefficient of friction of said one of said interior surface and said cylinder cap.

20. The assembly as set forth in claim 13, wherein said passageway includes a plurality of passages and said cylinder cap includes a plurality of said openings aligned with said plurality of passages.

21. The assembly as set forth in claim 13, wherein said cylinder cap includes an aperture that receives a cable having wires electrically connected to said electric actuator.

22. The assembly as set forth in claim 13, wherein said cylinder cap includes a threaded hole with a threaded fitting secured therein, said threaded fitting supporting an end of said electric actuator with an opposite end of said electric actuator abutting an inner ledge within said cavity.

\* \* \* \* \*